(12) United States Patent
Goguen

(10) Patent No.: US 11,667,044 B2
(45) Date of Patent: Jun. 6, 2023

(54) TOOL HAVING A DETECTABLE WIRELESS MARKER OR TAG

(71) Applicant: Dexter-Russell, Inc., Southbridge, MA (US)

(72) Inventor: Gary P. Goguen, Belchertown, MA (US)

(73) Assignee: Dexter-Russell, Inc., Southbridge, MA (US)

( * ) Notice: Subject to any disclaimer, the term of this patent is extended or adjusted under 35 U.S.C. 154(b) by 0 days.

(21) Appl. No.: 17/391,677

(22) Filed: Aug. 2, 2021

(65) Prior Publication Data

US 2023/0030095 A1    Feb. 2, 2023

(51) Int. Cl.
*B26B 11/00* (2006.01)
*G06K 19/077* (2006.01)

(52) U.S. Cl.
CPC ...... *B26B 11/008* (2013.01); *G06K 19/07758* (2013.01); *G06K 19/07773* (2013.01)

(58) Field of Classification Search
CPC .............. G08B 13/14; G08B 13/1463; G08B 13/2417; E05B 73/00; E05B 73/0017; E05B 73/0041; A61B 90/98; A61B 17/32002; G06K 19/00; G06K 19/06; G06K 19/077; G06K 19/07758; G06K 19/07773; B26B 11/00; B26B 11/008; B62B 3/00
See application file for complete search history.

(56) References Cited

U.S. PATENT DOCUMENTS

| 6,452,497 | B1 | 9/2002 | Finlayson | |
|---|---|---|---|---|
| 10,335,965 | B2 | 7/2019 | Loehnert | |
| 2004/0220602 | A1* | 11/2004 | Deng | A61B 90/98 |
| | | | | 606/167 |
| 2006/0049949 | A1* | 3/2006 | Jurs | A22B 7/002 |
| | | | | 235/492 |

(Continued)

FOREIGN PATENT DOCUMENTS

| DE | 93 00 173 U1 | 3/1993 |
|---|---|---|
| DE | 10 2008 026716 | 12/2009 |

(Continued)

OTHER PUBLICATIONS

NPL Search.*

*Primary Examiner* — Van T Trieu
(74) *Attorney, Agent, or Firm* — Bulkley, Richardson and Gelinas, LLP; Mary R. Bonzagai, Esq.

(57) ABSTRACT

A tool having a detectable wireless marker or tag is provided. The tool has a working portion with a projection or tang by which the working portion of the tool is held, a wireless tag located on, but insulated from the tang, and a handle disposed over and encompassing the projection or tang and the wireless tag. In an exemplary embodiment, the wireless tag is insulated from the tang using a housing assembly made up of an inner holder, an outer holder, and the detectable wireless tag positioned between the inner and outer holders. The invention allows for the use of fragile markers or tags, which are protected by the housing assembly from temperatures and pressures used during, for example, tool handle manufacturing processes. Also pro- (Continued)

vided is a method for providing a tool with a detectable wireless tag, and a method for tracking and tracing tools used within a packaging facility.

26 Claims, 2 Drawing Sheets

(56) References Cited

U.S. PATENT DOCUMENTS

| | | | | |
|---|---|---|---|---|
| 2007/0251063 | A1* | 11/2007 | Kusayama | A44B 19/32 |
| | | | | 24/381 |
| 2011/0095893 | A1* | 4/2011 | Leyden | G08B 13/2434 |
| | | | | 340/572.9 |
| 2018/0169844 | A1* | 6/2018 | Nemecek | G09F 3/0297 |
| 2020/0333421 | A1* | 10/2020 | Perkins | G01S 5/0247 |
| 2022/0197248 | A1* | 6/2022 | Weinberg | G05B 19/418 |

FOREIGN PATENT DOCUMENTS

| | | |
|---|---|---|
| EP | 2 043 826 | 2/2011 |
| EP | 2 280 609 | 8/2018 |

* cited by examiner

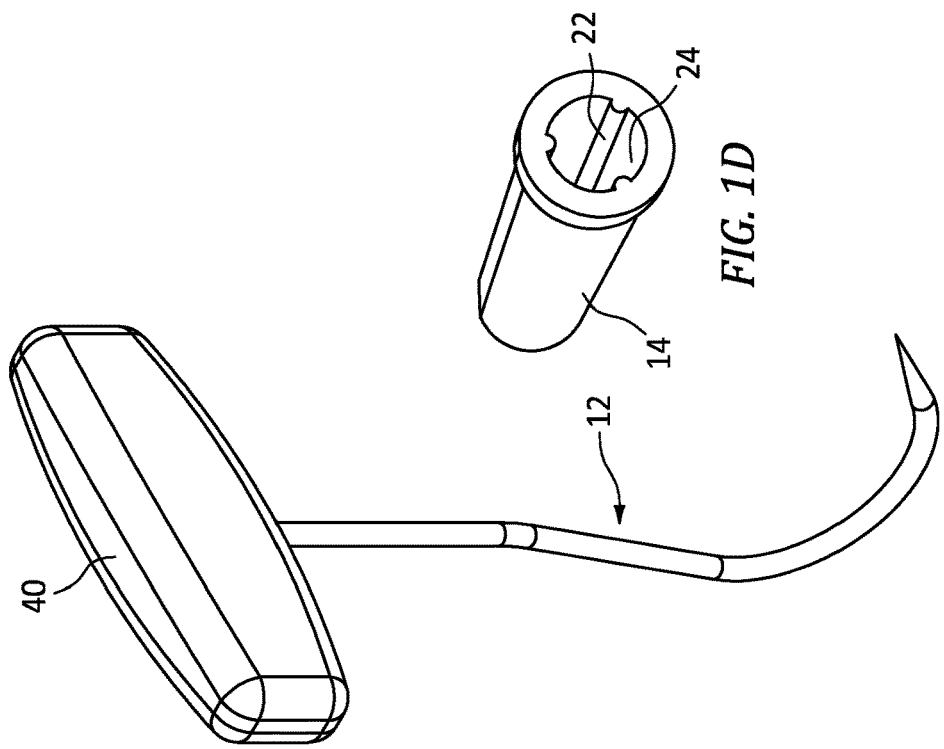
FIG. 1D
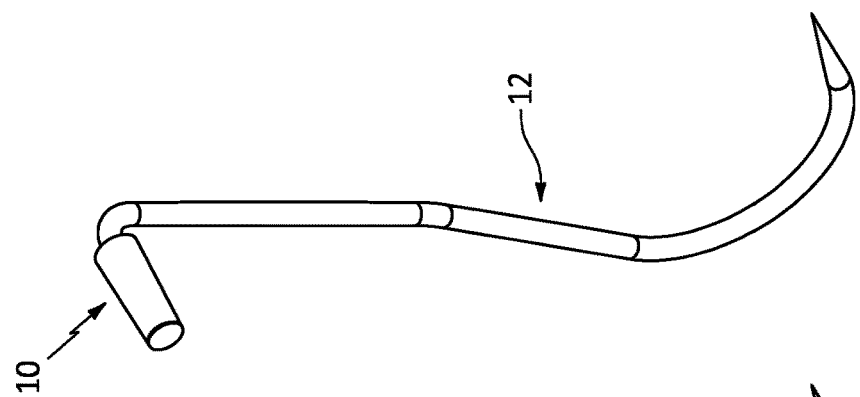
FIG. 1C
FIG. 1B
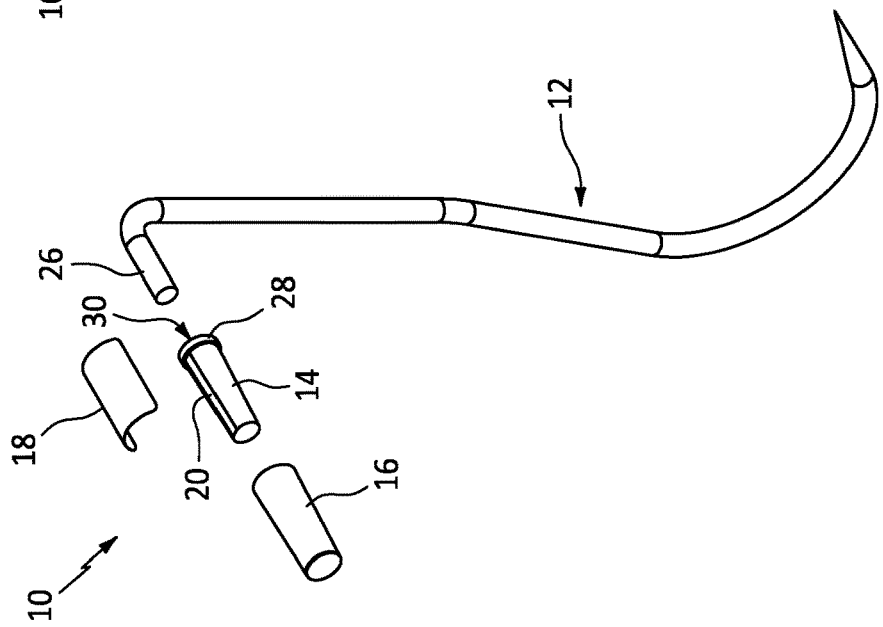
FIG. 1A

TOOL HAVING A DETECTABLE WIRELESS MARKER OR TAG

TECHNICAL FIELD

The present invention relates generally to a tool having a detectable wireless marker or tag (e.g., a radio frequency identification (RFID) tag), and more particularly to a tool having a working portion with a projection or tang by which the working portion of the tool is held, a wireless tag located on, but insulated from the tang, and a handle disposed over and encompassing the tang and the wireless tag.

BACKGROUND OF THE INVENTION

Cleanliness and sanitation are key in any meat, poultry, or fish packaging facility. Hand-held tools such as meat processing hooks and knives are used in such facilities, and due to the capability of such tools to transmit germs, users must adhere to a strict daily tool cleaning and disinfecting regimen. Routine cleaning and disinfecting of these tools ensures that meat, poultry and fish are not contaminated with harmful bacteria.

RFID tags in such hand-held tools are useful for the purpose of tracking and tracing these tools within these facilities to determine each tool's real-time location and to ensure that cleanliness and sanitation standards for each tool are being upheld. RFID tracking is also useful for determining the real-time condition of each tool and to use this information to manage the training/competency of the users, with a goal toward reducing repetitive motion injuries, which cost these facilities millions of dollars.

Typically, to apply RFID technology to a metal implement, a ceramic "on-metal" tag would be used. Such a tag is hardened against extremes of temperature and pressure and is designed to achieve optimal scan range when in contact with metal. The drawback of such a tag is expense. Standard processing tools such as knives wear out in only weeks, so added cost concerning such tools must be kept to an absolute minimum.

RFID tags in the form of miniature label-like device assemblies are inexpensive and thus more economically feasible. These label-like device assemblies, however, are also quite fragile and thus may be damaged by various adverse manufacturing and environmental conditions such as the high temperatures and pressures used during tool handle molding processes.

U.S. Pat. No. 10,335,965 to Loehnert (Friedr. Dick GmbH & Co., KG) relates to a knife having a knife blade with a tang and a label-like RFID transponder which is fixed to the tang. A knife handle surrounds the tang and the RFID transponder. The knife blade is produced from metal, in particular steel. The RFID transponder has an antenna and at least a portion of the antenna of the RFID transponder is constructed in a planar manner and is arranged parallel with a planar lateral face of the tang. The antenna of the RFID transponder may or may not be galvanically connected to the tang. In a first variant described in col. 2, lines 40-56, the antenna and tang are galvanically separated from each other, but there is electromagnetic (EM) coupling of the antenna to the tang. Good EM coupling is said to result from the parallel orientation and the small spacing (s 2 mm) between the antenna and the tang. The RFID transponder, however, is not protected from harm resulting from the heat and pressure using during the tool handle molding process.

It is therefore an object of the present invention to address this drawback by providing a means for protecting fragile tags from various adverse manufacturing and environmental conditions. More specific objects are to use an inexpensive detectable wireless tag that is structurally fragile as compared to ceramic tags, to hold the fragile tag in a desired location on a tool for optimal range and to maintain this desired location through a handle molding process (e.g., an injection molding process) and to protect the fragile tag from heat and pressure during such a handle molding process.

SUMMARY OF THE INVENTION

The present invention therefore provides an assembly that encompasses or houses a detectable wireless tag ("housing assembly"), which is suitable for use on a tool, and which comprises: an inner holder; an outer holder; and the detectable wireless tag positioned between the inner and outer holders.

The term "detectable wireless tag", as used herein, includes, but is not limited to, RFID tags, ultra-wide-band location (UWB) tags, Wireless Fidelity (WiFi) location tags and infrared (IR) location tags.

The present invention further provides a tool having a detectable wireless tag, wherein the tool comprises: a working portion (e.g., a blade or a hook) with a projection or tang by which the working portion of the tool is held; a detectable wireless tag located on, but insulated from the tang; and a handle disposed over and encompassing the projection or tang and the detectable wireless tag. The wireless tag, which has its own effective antenna, operates independently of the tang.

The term "tool", as used herein, relates to a device or implement, especially one held in the hand, used to carry out a particular function, and includes, but is not limited to, knives, meat cleavers, steels, meat or meat processing hooks, manual meat and bone saws and meat tenderizers.

In an exemplary embodiment, the inventive housing assembly, as described above, serves to insulate the wireless tag from the tool's tang.

In one such exemplary embodiment, the tool is a meat or meat processing hook and the inner and outer holders of the inventive assembly are both substantially conical in overall shape and have a substantially circular cross-sectional shape. The inner holder, which is sized to nest within the outer holder, has a substantially flat section on its outer surface, which is sized to accommodate all or a portion of the detectable wireless tag.

In another such exemplary embodiment, the tool is a knife and the inner and outer holders of the inventive assembly both have a flattened cylindrical overall shape and a substantially oval cross-sectional shape. The inner holder, which is sized to nest within the outer holder, has a substantially flat section on its outer surface, which is sized to accommodate all or a portion of the detectable wireless tag.

The present invention further provides a method for providing a tool with a detectable wireless tag, which comprises:

(a) arranging for a detectable wireless tag to be housed within an assembly; and either (b)(1) arranging for the assembly housing the detectable wireless tag to be positioned on the projection or tang of the tool, and then arranging for either (i) a handle to be formed over and thereby encompass the assembly and the tang, or (ii) the tang with the assembly to be inserted into a hole in a pre-existing handle and then at least partially filling the hole to firmly hold in place the assembly and the tang; or (b)(2) arranging for a handle to be formed over and thereby encompass the assembly housing the detectable wireless tag and attaching the tang to the handle and assembly using known techniques (e.g. hafting technique).

The present invention also provides a method for monitoring (tracking and tracing) tools used within a packaging facility (e.g., a meat, poultry or fish packaging facility), which method comprises: using the above-referenced housing assembly with tools used within the packaging facility to track and trace each tool within the facility.

Other features and advantages of the invention will be apparent to one of ordinary skill from the following detailed description. Unless otherwise defined, all technical and scientific terms used herein have the same meaning as commonly understood by one of ordinary skill in the art to which this invention belongs.

All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications, and equivalents.

Particular features of the disclosed invention are illustrated by reference to the accompanying drawings in which:

FIG. 1A is a schematic exploded view of an exemplary embodiment of the inventive housing assembly with detectable wireless tag and a tool in the form of a metal hook before the inventive housing assembly is assembled onto the tang of the metal hook;

FIG. 1B is a schematic view of the inventive housing assembly shown in FIG. 1A upon assembly onto the tang of the metal hook;

FIG. 1C is a schematic view of an exemplary embodiment of the tool (metal hook) of the present invention, which is shown with a handle overmolded onto both the inventive housing assembly and the tang of the metal hook shown in FIG. 1B;

FIG. 1D is a schematic view of an exemplary embodiment of the inner holder of the housing assembly shown in FIG. 1A, which is shown with three ribs extending from an inner surface of the holder;

DETAILED DESCRIPTION OF THE INVENTION

Figure 2A:
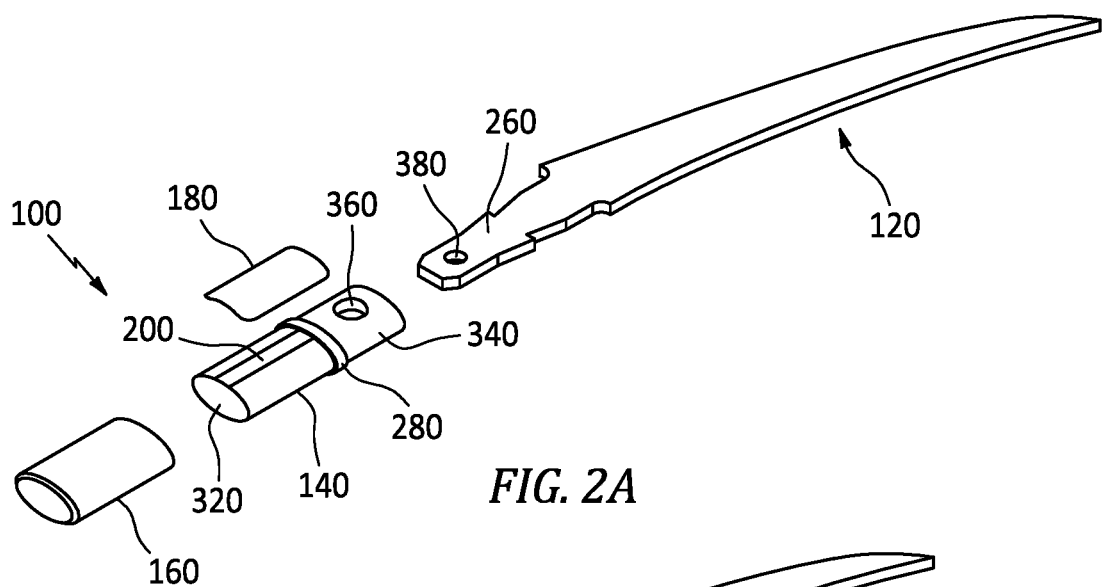
FIG. 2A is a schematic exploded view of another exemplary embodiment of the inventive housing assembly with detectable wireless tag and a tool in the form of a knife before the inventive housing assembly is assembled onto the tang of the knife.

Although the present invention will be described hereinbelow mainly in association with tools in the form of meat or meat processing hooks and knives and further in association with detectable wireless tags in the form of RFID tags, the invention is not so limited. Tools have been described above as including, but not limited to, knives, meat cleavers, steels, meat or meat processing hooks, manual meat and bone saws and meat tenderizers, while detectable wireless tags have been described above as including, but not limited to, RFID tags, UWB tags, WiFi location tags and IR location tags.

Tool

As noted above, exemplary tools for use in the present invention include, but are not limited to, meat or meat processing hooks and knives. Each tool comprises a working portion with a projection or tang by which the working portion (e.g., a hook or a blade) of the tool is held. Such tools, which are typically made of metal (e.g., steel), are widely available from known manufacturers.

RFID System

A typical RFID system includes two primary types of components, namely, a reader device and a tag.

The RFID tag is typically a very small label-like device assembly containing an integrated circuit ("IC") chip and an antenna mounted on a flexible plastic or paper substrate. The tag can respond, via a wireless air interface channel, to a Radio Frequency (RF) interrogation signal generated and transmitted by the reader device. The RFID tag is configured to generate a return reply signal in response to the RF interrogation signal emitted by the reader, the response signal being modulated in a manner to convey identification (e.g., a unique code or identifier for the tool) or other data stored within the tag or remotely in the cloud (e.g., on the Internet) back to the reader device. The term "cloud", as used herein, is meant to broadly encompass all remote data storage configurations.

The RFID tag used in the practice of the present invention is "passive", meaning that the tag has no battery and is excited and powered by the reader/antenna signal. This is different from an "active" tag, which contains a battery, and thus is self-powered.

The substrate serves to hold the tag components together. The tag antenna is deposited or printed on the substrate, and the IC chip is then attached to this antenna. The substrate, as noted above, is usually made from flexible material such as a flexible plastic or paper material, but it may also be made from a rigid material (e.g., a ceramic material). Most passive tags use substrates made from flexible material with a preferred thickness ranging from about 50 to about 200 micrometers (μm). Passive tags using substrates made from a rigid ceramic material have a preferred thickness ranging from about 2.0 to about 3.0 millimeters (mm).

The substrate material must be able to withstand various environmental conditions through which the tag may pass during its lifespan. Some of the materials used for the substrate include, but are not limited to, paper and polymers such as phenolics, polyamides (nylons), polyesters, polyethylene terephthalate (PET), polypropylene, polyvinyl chloride (PVC), and styrene. The substrate material must provide a smooth printing surface for antenna layout, mechanical protection for the antenna, chip, and their interconnections, dissipation of static buildup, and durability and stability under various operating conditions. Some of the environmental conditions that can affect the substrate are heat, moisture, vibration, chemicals, sunlight, abrasion, impact, and corrosion. One side of the substrate is usually coated with an adhesive material to attach the tag to an object. The adhesive material must be able to withstand appropriate environmental conditions.

RFID tags can be classified by the RF range they use to communicate (i.e., low, high, or ultra-high), and the way the tag communicates with the reader (active or passive).

In an exemplary embodiment, the "passive" RFID tag used in the practice of the present invention measures from about 20 to about 28 mm (preferably, from about 22 to about 26 mm) in total length, and from about 10.5 to about 20.5 mm (preferably, from about 13.5 to about 17.5 mm) in total width, and incorporates an IC chip and an antenna into a substrate, the substrate being selected from the group of single or multi-layer flexible plastic or paper substrates. In another exemplary embodiment, the RFID tag is a "passive" RFID tag made using a hardened ceramic substrate.

In a preferred embodiment, the RFID tag is a passive Ultra-High Frequency (UHF) RFID tag (plastic substrate) with an adhesive backing, which operates in the about 860 megahertz (MHz) to about 960 MHz range.

The RFID tag preferably has a wide omnidirectional read range, even when covered or embedded within both the inventive housing assembly and tool handle, of at least about 30 centimeters (cm), more preferably, from about 30 to about 200 cm. The RFID tag may be read by any suitable RFID reader.

The RFID tag of the present invention is located on, but insulated from, the tang using the inventive tag housing assembly, as described in more detail below.

Housing Assembly

The present invention provides an assembly that houses or encompasses a detectable wireless tag (e.g., an RFID tag), which is suitable for use on a tool, and which comprises: an inner holder; an outer holder; and the detectable wireless tag positioned between the inner and outer holders.

The inventive housing assembly serves: to hold the tag in a desired position/location for optimal range through one or more manufacturing processes (e.g., a molding or overmolding process for producing a handle); and to protect the tag from harm resulting from its exposure to raised temperatures and pressures during the one or more manufacturing processes.

Referring now to the drawings in detail, reference numerals 10 and 100 have been used to denote a first and a second exemplary embodiment of the inventive housing assembly, respectively.

In the first exemplary embodiment 10, which is shown in FIG. 1A, the tool is a meat processing hook 12, and the housing assembly 10 comprises: an inner holder 14; an outer holder 16; and a detectable wireless tag 18 positioned between the inner and outer holders 14, 16. In this exemplary embodiment, both the inner holder 14 and the outer holder 16 are substantially conical in overall shape and have a substantially circular cross-sectional shape. The inner holder 14, which is sized to nest within the outer holder 16, has a substantially flat section 20 on its outer surface, which is sized to accommodate all or part of the tag electronics (i.e., IC chip) of the detectable wireless tag 18. When the outer holder 16 is positioned over the inner holder 14, the substantially flat section 20 of the inner holder 14 forms a gap which aides in protecting the tag electronics. The antenna portion of the tag 18 will typically extend beyond opposing longitudinal edges of the substantially flat section 20 of the inner holder 14.

As best shown in FIG. 1D, the inner holder 14 has a plurality of ribs (preferably from about 2 to about 4 ribs) 22, on its inner surface 24, which are designed to contact the projection or tang 26, of the tool. The ribs 22, allow for a secure fit between the inner holder and the tang of a tool regardless of minor variations in the size/diameter of the inner holder and/or the tang.

During assembly of the inventive housing assembly, all or part of the tag electronics are positioned over and adhered to the substantially flat section 20 of the inner holder 14. The substantially flat section 20 has the added benefit of serving as a visual aid for proper tag placement during assembly. The antenna portion of the tag 18 is then wrapped and adhered around the outer surface of the inner holder 14 on both sides of the substantially flat section 20. Hence, once applied onto tang 26 (as shown in FIG. 1B), the RFID tag 18 is positioned substantially equidistant from tang 26, wrapping around it in a circular fashion. The inventive housing assembly 10 maintains the detectable wireless tag 18 at a distance of at least about 0.5 mm (preferably, from about 1.0 to about 2.0 mm) from the tang 26 of the meat processing hook 12.

As will be readily appreciated by those skilled in the art, for less flexible tags (e.g., hardened ceramic tags) that cannot wrap around the inner holder in a circular fashion, the inner and outer holders would be adapted to accommodate the tag shape.

Figure 2B:
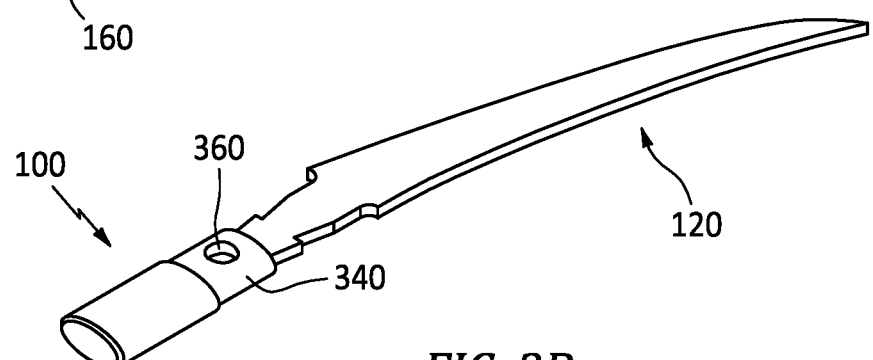
FIG. 2B is a schematic view of the inventive housing assembly shown in FIG. 2A upon assembly onto the tang of the knife.

In the second exemplary embodiment 100, which is shown in FIG. 2A, the tool is a knife 120, and the housing assembly 100 comprises: an inner holder 140; an outer holder 160; and a detectable wireless tag 180 positioned between the inner and outer holders 140, 160. In this second exemplary embodiment, both the inner holder and the outer holder have a flattened cylindrical overall shape and a substantially oval cross-sectional shape. As shown in FIG. 2D, inner holder 140 has an inner rectangle-shaped slot 410 located at its proximal end 420 for securely receiving the tang.

Similar to the first exemplary embodiment, during assembly of the inventive housing assembly 100, all or part of the tag electronics are positioned over and adhered to the substantially flat section 200 of the inner holder 140. The antenna portion of the tag 180 is then wrapped and adhered around the outer surface of the inner holder 140 on both sides of the substantially flat section 200. Hence, once applied onto tang 260 (as shown in FIG. 2B), the RFID tag 180 is positioned substantially equidistant from tang 260. The inventive housing assembly 100 maintains the detectable wireless tag 180 at a distance of at least about 0.5 mm (preferably, from about 1.0 to about 2.0 mm) from the tang 260 of the knife 120.

Again, for less flexible tags (e.g., hardened ceramic tags) that cannot wrap around the inner holder, the inner and outer holders would be adapted to accommodate the tag shape.

In both the first and second exemplary embodiments, as shown in FIGS. 1A, 2A, the inner holder 14, 140, has a collar 28, 280, which allows the inner and outer holders to securely fit (e.g., snap-fit) together. In the first exemplary embodiment, collar 28 is located on proximal end 30, while in the second exemplary embodiment, collar 280 is located from about 24.13 to about 26.67 mm from distal end 320. When securely fit together, the outer holder 16, 160, and the inner holder 14, 140, have points of contact only around the collar region, and thus there is little or no contact between the detectable wireless tag 18, 180, and the outer holder 16, 160.

Inner holder 140 of the second exemplary embodiment, as shown in FIGS. 2A, 2B, has a section 340, which extends beyond the collar 280, and which contains a hole 360 that aligns with a hole 380 on tang 260. This allows molten plastic (during formation of handle 400, as described below) to flow in through the aligned holes, thereby strengthening coupling of the handle to the tang.

The inner holder 14, 140 and the outer holder 16, 160, of the first and second exemplary embodiments, are both made from high-temperature, RF translucent materials such as polyethylene terephthalate (PET), polypropylene (PP), polyoxymethylene (POM), polycarbonate (PC), acrylonitrile butadiene styrene (ABS), polyamide 66P (A66), and ethylene propylene diene monomer (EPDM). The inner and outer holders may be 3D printed for low volume demands and injection molded for higher volume demands.

In the first exemplary embodiment, the inner and outer holders, 14, 16, both have a thickness ranging from about 0.74 to about 2.10 mm (preferably from about 0.77 to about 2.08 mm). The inner holder 14 has a length ranging from about 26.62 to about 26.72 mm, preferably, from about 26.62 to about 26.67 mm, an inner diameter ranging from about 4.90 to about 5.64 mm, preferably from about 4.95 to about 5.59 mm, and an outer diameter ranging from about 6.86 to about 9.83 mm, preferably from about 6.86 to about 9.78 mm. As will be readily appreciated by those skilled in the art, a draft angle applied to each holder will make the diameters different at the proximal and distal ends of the holder. The outer holder 16 has a length ranging from about 27.89 to about 27.99 mm, preferably, from about 27.94 to about 27.99 mm, an inner diameter ranging from about 7.77 to about 9.73 mm, preferably, from about 7.77 to about 9.68 mm, and an outer diameter ranging from about 9.35 to about 11.23 mm, preferably, from about 9.40 to about 11.18 mm.

In the second exemplary embodiment, the inner and outer holders 140, 160, both have a thickness ranging from about 0.75 to about 2.58 mm (preferably from about 0.78 to about 2.54 mm). The inner holder 140 has a length ranging from about 43.13 to about 43.23 mm, preferably, from about 43.13 to about 43.18 mm, an inner semi-minor diameter ranging from about 7.57 to about 8.18 mm, preferably, from about 7.62 to about 8.13 mm, an inner semi-major diameter ranging from about 14.96 to about 15.80 mm, preferably, from about 15.24 to about 15.75, an outer semi-minor diameter ranging from about 7.57 to about 8.18 mm, preferably, from about 7.62 to about 8.13 mm, and an outer semi-major diameter ranging from about 15.19 to about 15.80 mm, preferably, from about 15.24 to about 15.75 mm. The rectangle-shaped slot positioned inside the inner holder 140 for securely receiving the tang, has a width ranging from about 2.49 to about 2.60 mm, preferably, from about 2.49 to about 2.54 mm, and a length ranging from about 10.11 to about 10.21 mm, preferably, from about 10.11 to about 10.16 mm.

The outer holder 160 has a length ranging from about 27.38 to about 27.48 mm, preferably, from about 27.42 to about 27.48 mm, an inner semi-minor diameter ranging from about 8.08 to about 8.18 mm, preferably, from about 8.08 to about 8.13 mm, an inner semi-major diameter ranging from about 15.70 to about 15.80 mm, preferably, from about 15.70 to about 15.75 mm, an outer semi-minor diameter ranging from about 9.09 to about 9.20 mm, preferably, from about 9.14 to about 9.20 mm, and an outer semi-major diameter ranging from about 16.71 to about 16.82 mm, preferably, from about 16.76 to about 16.82 mm.

When assembled onto the tang of a tool, the antenna of the wireless tag and the tang are galvanically separated and are not electromagnetically coupled. In other words, the subject invention does not provide for the electromagnetic coupling of the antenna of the wireless tag to the tang.

Handle

Handles may be made from any suitable material including, but not limited to, plastics, metal, wood, stone, composite, synthetic, natural, and man-made materials.

In an exemplary embodiment, the tang and the housing assembly, which surrounds the tang, are overmolded with a plastics material using, for example, an injection molding (i.e., heat/pressure molding) or other forming process. Suitable plastics materials include, but are not limited to, moldable plastics such as polyethylene, polypropylene, polystyrene, and vinyl acetate. In one exemplary embodiment, the tool is a meat or meat processing hook and the moldable plastics material is a purple-colored moldable plastics material.

Figure 2C:
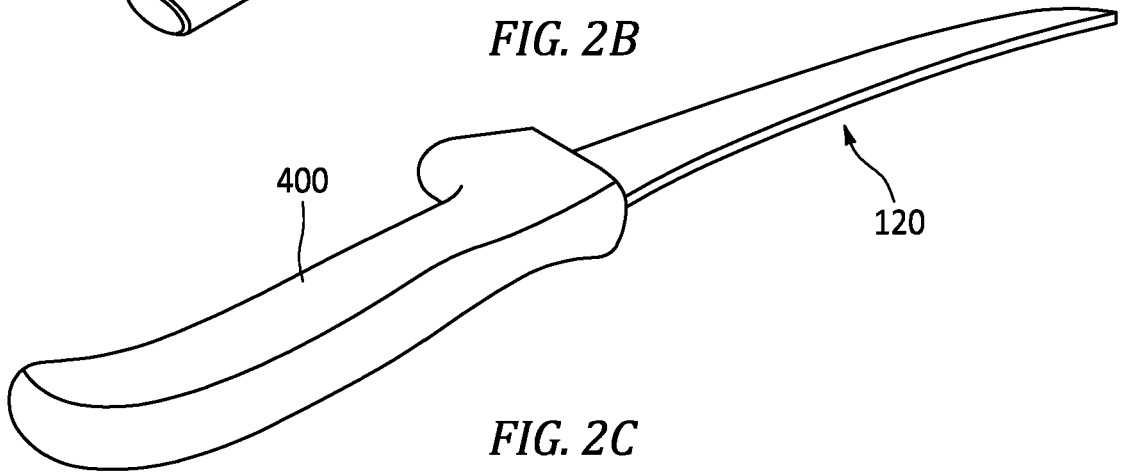
FIG. 2C is a schematic view of an exemplary embodiment of the tool (knife) of the present invention, which is shown with a handle overmolded onto both the inventive housing assembly and the tang of the knife shown in FIG. 2B.
Figure 2D:
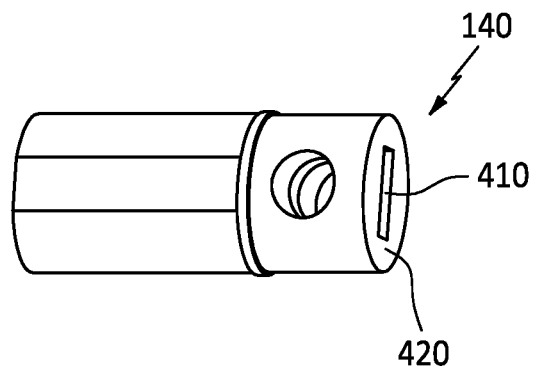
FIG. 2D is a schematic view of an exemplary embodiment of the inner holder of the housing assembly shown in FIG. 2A, which is shown with a rectangle-shaped slot for receiving the tang.

The first and second exemplary embodiments overmolded with a plastics material to form a handle 40, 400, are shown in FIGS. 1C and 2C.

Upon completion of the molding process, and upon cooling of the overmolded assembly to ambient temperature, Acceptance Quality Limits (AQL) testing (scan performance) is performed. The testing involves signaling the passive RFID tag (which is now embedded inside the housing assembly and the handle) and receiving an expected acknowledging signal from the RFID tag using an RFID omnidirectional scanner within a desired range of at least about 30 cm, preferably, from about 30 to about 200 cm.

In another exemplary embodiment, a handle is molded onto the housing assembly separate from the tang (e.g., injection molded) and upon cooling is attached to the tang using, for example, known hafting techniques. In one such exemplary embodiment, the inventive housing assembly is pressed, by hand, onto a tang-shaped tongue (i.e., a steel molding fixture). The tongue is held in place during the handle molding process, and then removed immediately, while hot, leaving the housing assembly and a tang-shaped hole in the handle. When hafted, the tang is slid into the hole and through the housing assembly.

Alternatively, the handle may be prepared with an elongated hollow hole at its center. The tang and housing assembly are inserted into the hollow hole and an injection molded plastic material is used to cover, surround, and hold the handle to both the tang and the housing assembly.

Method for Providing a Tool with a Detectable Wireless Tag

The present invention further provides a method for providing a tool with a detectable wireless tag, which comprises:

(a) arranging for a detectable wireless tag to be housed within an assembly; and either (b)(1) arranging for the assembly housing the detectable wireless tag to be positioned on the projection or tang of the tool, and then arranging for either (i) a handle to be formed over and thereby encompass the assembly and the tang, or (ii) the tang with the assembly to be inserted into a hole in a pre-existing handle and then at least partially filling the hole to firmly hold in place the assembly and the tang; or (b)(2) arranging for a handle to be formed over and thereby encompass the assembly housing the detectable wireless tag and attaching the tang to the handle and assembly using known techniques (e.g. hafting technique).

In an exemplary embodiment, the inventive method comprises:

1. moving the inner holder 14, 140 onto the projection or tang 26, 260 and tapping it into place using, for example, a rubber mallet;
2. adhering the detectable wireless tag 18, 180 onto the inner holder 14, 140 so that the tag electronics are positioned over the substantially flat section 20, 200, the tag antenna extending on either side of the substantially flat section;
3. moving and engaging (e.g., snap-fitting) the outer holder 16, 160 onto the inner holder 14, 140; and then
4. either arranging for a handle to be formed over and thereby encompass the housing assembly 10, 100 and the tang 26, 260, or arranging for the housing assembly 10, 100 and the tang 26, 260 to be inserted into a hole in a pre-existing handle and then bonded in place by at least partially filling the hole with, for example, a melt flowing adhesive.

In another exemplary embodiment, the inventive method comprises:

1. adhering the detectable wireless tag 18, 180 onto the inner holder 14, 140 so that the tag electronics are positioned over the substantially flat section 20, 200, the tag antenna extending on either side of the substantially flat section;
2. moving and engaging (e.g., snap-fitting) the outer holder 16, 160 onto the inner holder 14, 140 for form an assembly;
3. arranging for a handle to be formed over and thereby encompass the assembly; and
4. attaching the tang to the handle and assembly using, for example, a hafting technique.

Method for Monitoring (Tracking and Tracing) Tools Used within a Packaging Facility The present invention also provides a method for monitoring (tracking and tracing) tools used within a packaging facility (e.g., a meat, poultry or fish packaging facility), which method comprises: using the inventive housing assembly with tools used within the packaging facility to track and trace each tool within the facility. By use of the inventive monitoring method, each tool's real-time location may be determined and the maintenance of cleanliness and sanitation standards for each tool ensured. The inventive method may also be used to determine the real-time condition of each tool and to use this information to manage the training/competency of the users, with a goal toward reducing repetitive motion injuries.

Although exemplary embodiments have been shown and described, it will be clear to those of ordinary skill in the art that a number of changes, modifications, or alterations to the invention as described can be made. All such changes, modifications, and alternations should therefore be seen as within the scope of the disclosure.

I claim:

1. An assembly which houses or encompasses a detectable wireless tag, which is suitable for use on a tool, and which comprises: an inner holder; an outer holder, which at least partially encompasses the inner holder; and the detectable wireless tag positioned between the inner and outer holders.

2. The assembly of claim 1, wherein the detectable wireless tag is selected from the group of radio frequency identification (RFID) tags, ultra-wide-band location (UWB) tags, WiFi location tags and infrared (IR) location tags.

3. The assembly of claim 2, wherein the detectable wireless tag is an RFID tag.

4. The assembly of claim 3, wherein the RFID tag is a passive ultra-high frequency RFID tag.

5. The assembly of claim 1, wherein the tool is a meat or meat processing hook and the inner and outer holders are both substantially conical in overall shape and have a substantially circular cross-sectional shape, wherein the inner holder, which is sized to nest within the outer holder, has a substantially flat section on its outer surface, which is sized to accommodate all or a portion of the detectable wireless tag.

6. The assembly of claim 1, wherein the tool is a knife and the inner and outer holders both have a flattened cylindrical overall shape and a substantially oval cross-sectional shape, wherein the inner holder, which is sized to nest within the outer holder, has a substantially flat section on its outer surface, which is sized to accommodate all or a portion of the detectable wireless tag.

7. The assembly of claim 6, wherein the knife has a working portion with a projection or tang by which the working portion of the knife is held, wherein the inner holder has an inner rectangle-shaped slot located at one end of the inner holder for securely receiving the tang.

8. A method for tracking and tracing tools used within a packaging facility, which method comprises using the assembly of claim 1 with tools used within the packaging facility to track and trace each tool within the facility.

9. The method of claim 8, wherein the tool comprises: a working portion with a projection or tang by which the working portion of the tool is held; the detectable wireless tag located on but insulated from the tang; and a handle disposed over and encompassing the tang and the detectable wireless tag, wherein the detectable wireless tag, which has its own antenna, operates independently of the tang.

10. The method of claim 9, wherein the tool is a meat or meat processing hook, and the handle is made using a purple-colored material.

11. A tool having a detectable wireless tag, wherein the tool comprises: a working portion with a projection or tang by which the working portion of the tool is held; the detectable wireless tag located on but insulated from the tang; and a handle disposed over and encompassing the tang and the detectable wireless tag, wherein the detectable wireless tag, which has its own antenna, operates independently of the tang, and wherein said tool further comprises a housing assembly positioned on the projection or tang, which comprises an inner holder and an outer holder, which at least partially encompasses the inner holder, wherein the detectable wireless tag is positioned between the inner and outer holders.

12. The tool of claim 11, which is selected from the group of knives, meat cleavers, steels, meat or meat processing hooks, manual meat and bone saws and meat tenderizers.

13. The tool of claim 12, wherein the tool is a meat or meat processing hook.

14. The tool of claim 12, wherein the tool is a knife.

15. The tool of claim 11, wherein the tool is a meat or meat processing hook, and wherein both the inner holder and the outer holder are substantially conical in overall shape and have a substantially circular cross-sectional shape, wherein the inner holder, which is sized to nest within the outer holder, has a substantially flat section on its outer surface, which is sized to accommodate all or part of the detectable wireless tag.

16. The tool of claim 15, wherein the inner holder has a plurality of ribs on its inner surface, which are designed to contact the projection or tang of the tool.

17. The tool of claim 11, wherein the tool is a knife, and wherein both the inner holder and the outer holder have a flattened cylindrical overall shape and a substantially oval cross-sectional shape, wherein the inner holder, which is sized to nest within the outer holder, has a substantially flat section on its outer surface, which is sized to accommodate all or part of the detectable wireless tag.

18. The tool of claim 17, wherein the inner holder has an inner rectangle-shaped slot located at one end of the inner holder for securely receiving the tang.

19. The tool of claim 17, wherein the inner holder and the tang each have aligned holes, which allow molten plastic during formation of a tool handle to flow in through the aligned holes, thereby strengthening coupling of the handle to the tang.

20. The tool of claim 11, wherein the wireless tag has a wide omnidirectional read range when covered or embedded within the housing assembly and handle of at least about 30 centimeters.

21. The tool of claim 13, wherein the handle is made using a purple-colored material.

22. A method for providing a tool with a detectable wireless tag, wherein the tool comprises a working portion with a projection or tang by which the working portion of the tool is held, wherein the method comprises: arranging for a detectable wireless tag to be housed within an assembly; arranging for the assembly housing the detectable wireless tag to be positioned on the tang of the tool; and then arranging for either (a) a handle to be formed over and thereby encompass the assembly and the tang, or (b) the tang with the assembly positioned thereon to be inserted into a hole in a pre-existing handle, and then at least partially filling the hole to firmly hold in place the assembly and the tang, wherein the assembly comprises an inner holder and an outer holder, which at least partially encompasses the inner holder, wherein the detectable wireless tag is positioned between the inner holder and the outer holder of the assembly.

23. The method of claim 22, wherein the tool is a meat or meat processing hook, and the handle is formed using a purple-colored material.

24. A method for providing a tool with a detectable wireless tag, wherein the tool comprises a working portion with a projection or tang by which the working portion of the tool is held, wherein the method comprises: arranging for a detectable wireless tag to be housed within an assembly; and arranging for a handle to be formed over and thereby encompass the assembly, and then attaching the tang to the handle encompassing the assembly, wherein the assembly comprises an inner holder and an outer holder, which at least partially encompasses the inner holder, wherein the detectable wireless tag is positioned between the inner holder and the outer holder of the assembly.

25. The method of claim 24, wherein the tool is a meat or meat processing hook, and the handle is formed using a purple-colored material.

26. The method of claim 25, wherein the detectable wireless tag is an RFID tag.

\* \* \* \* \*